UNITED STATES PATENT OFFICE.

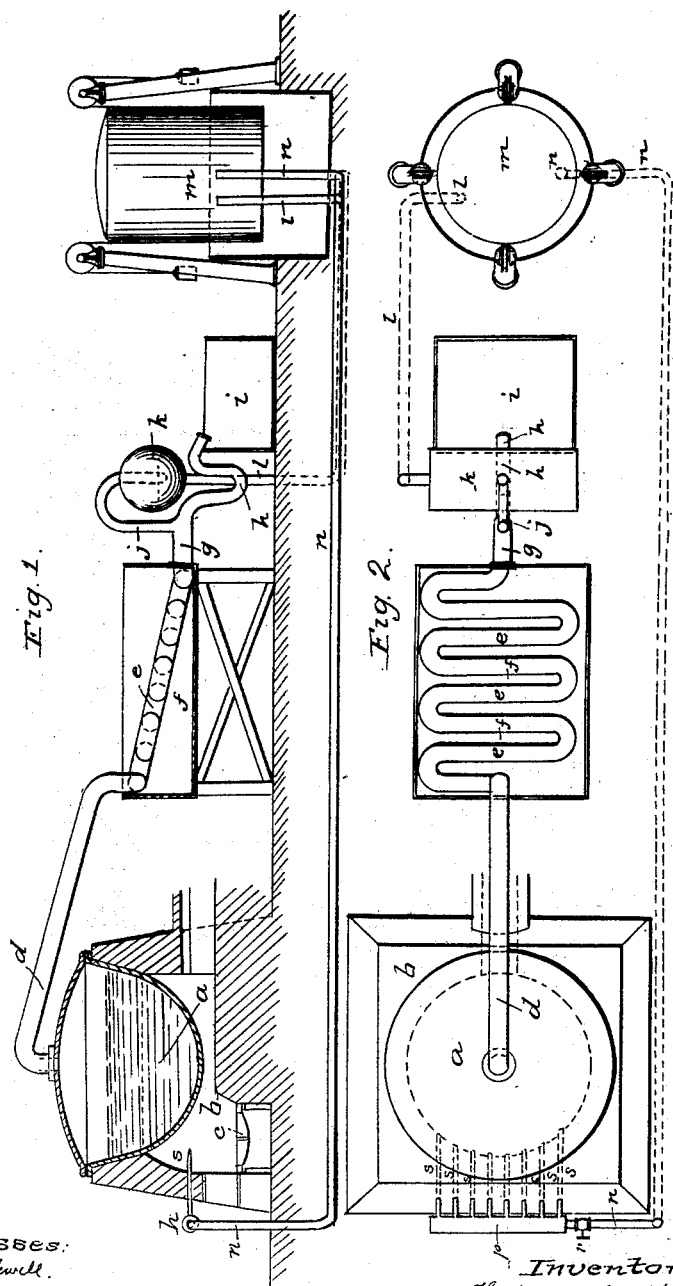

HERBERT W. C. TWEDDLE, OF PITTSBURG, PENNSYLVANIA.

IMPROVED MODE OF UTILIZING THE WASTE GAS FROM PETROLEUM-DISTILLERIES.

Specification forming part of Letters Patent No. 45,363, dated December 6, 1864.

*To all whom it may concern:*

Be it known that I, HERBERT W. C. TWEDDLE, of the city of Pittsburg, in the county of Allegheny and State of Pennsylvania, have invented a new and useful Improvement in the Mode of Utilizing the Waste Gas from Oil-Retorts or Stills; and I do hereby declare the following to be a full, clear, and exact description thereof, reference being had to the accompanying drawings, forming part of this specification, in which—

Figure 1 is a side view or elevation of the apparatus which I employ for distilling petroleum or carbon oil to which my improvement is applied, and Fig. 2 is a plan or top view of the same.

In both figures like letters of reference are used to denote similar parts of the apparatus.

It is well known to those engaged in the refining and distilling of petroleum or carbon oil that a large amount of non-condensable fixed gas is evolved during the process of distillation, which is allowed to escape at the gas-trap into the open air. At first the gas which is thus set free is rich in hydrogen, subsequently carbureted hydrogen is evolved, and toward the end of the operation carbonic oxide and carbonic-acid gas are produced; and as these gases are impregnated with sulphur they give a very offensive odor, well known to those who have been in the vicinity of such works, and which render their proximity in the estimation of many a great nuisance; but the offensive smell of these sulphureted gases is the least part of the evil, for carbureted hydrogen gas is highly inflammable, and when set free and becoming mixed with a certain proportion of atmospheric air, it is highly explosive, and has been the frequent cause of serious accidents and destructive conflagrations. The quantity of fixed non-condensable and inflammable gas thus evolved in the process of distilling petroleum varies with the different qualities and gravities of oil, and also depends in some measure on the mode in which the process of distillation is carried on. A quick operation in a close still gives less fixed gas than a slower process in open stills with the fire circulating higher around them. The percentage of petroleum thus lost by conversion into non-condensable gas varies from seven to ten per cent. By a "non-condensable gas" in this connection I mean gas which will not condense into oil by passing through the ordinary worm or pipes in a refrigerator.

The object of my improvement is to utilize the gas thus generated by employing it for heating the stills, and, if necessary, lighting the works. This is a great improvement in the process of distilling carbon oils, because it saves a large amount of coal or other fuel which would otherwise be necessarily employed in heating the stills. It also enables the operator to control the heat under the stills as it cannot be done where an ordinary furnace is used, and the ability to regulate the heat at will is a very important matter in the operation of distilling petroleum, as the process is more effectively and economically carried on by varying the degree of heat applied to the stills at different stages of the work.

Another great advantage of my improvement is that it enables oil-refineries to be operated at points where coal cannot be readily obtained or is very expensive, so that they can be economically carried on at the oil-wells where the crude oil is obtained, and saves the transportation of the crude oil, and obviates the enormous expense of the packages for the oil in its crude state.

To enable others skilled in the art of distilling oils to use my invention, I will proceed to describe the apparatus which I employ for the purposes of my invention.

In the drawings, $a$ is a still set over a furnace, $b$, which may be so built with a fire-bed, $c$, as to allow a small fire of coal or wood to be used. From the still $a$ a goose-neck, $d$, carries off the condensable vapor, and, mingled with it, the permanent gases, to a worm, $e$, which traverses the cold-water tank or refrigerator $f$. At the lower end of the refrigerator $f$ the pipe $g$ conducts the condensed oil through the gas-trap $h$ into the oil-receiver $i$. The gas-trap $h$ is a bent pipe, in the bottom of which some oil always remains, preventing the passage of the permanent gas and uncondensed vapor beyond that point. These rise through the stand-pipe $j$, which is bent over at top, and enters the hydraulic main $k$, which may be a long cylinder receiving the extremity of each of the stand-pipes of a row of stills. In this hydraulic main is some water or oil, which stands at such a height as to cover the open end of the stand-pipe $j$, as shown by dotted lines in Fig. 1. In this hydraulic main is collected any oil which may be carried over by the gas, or which may be condensed from any oleaginous vapor which may have not been condensed in the refrigerator.

From the hydraulic main $k$ a pipe, $l$, conducts the gas collected in the main to a gas-holder, $m$, of ordinary construction, whence a service-pipe, $n$, leads the gas, as it may be needed, to the furnaces. A horizontal pipe, $p$, is placed in front of a row of stills or otherwise in convenient proximity thereto, into which pipe the service-pipe $n$ enters, and from the horizontal pipe $p$ a number of small burner-pipes, $s$, pass into the fire-chamber $q$ under the stills $a$. A constant stream of highly-inflammable gas is thus supplied to the under side of the stills, which, when ignited, burns with a vivid and steady flame, the degree and intensity of which is regulated at pleasure by the cock $r$. A small fire of coal or wood may be kept on the fire-bed $c$, which serves to keep the gas alight and to ignite it when it is turned on. This auxiliary fire, however, is not absolutely necessary.

If preferred, the use of the gas-holder may be dispensed with by leading a service-pipe immediately to the furnace from the hydraulic main $k$; but this plan is not so safe, and the supply of gas to the furnace will not be so regular, as the pressure of gas in the hydraulic main will depend on the relation between the quantity of permanent gas evolved from the stills and the quantity needed for the furnace, which will not be uniform. I therefore recommend the use of a gas-holder as a reservoir for the gas and as a means of regulating the pressure, so as to furnish a constant and uniform stream of gas to the furnace.

Having thus described my improvement, what I claim as my invention, and desire to secure by Letters Patent, is—

The mode hereinbefore described of heating the furnaces of stills for distilling petroleum or carbon oil by means of the permanent gas evolved from the petroleum in the stills during the process of distillation, substantially as and for the purposes hereinbefore described.

In testimony whereof I, the said HERBERT W. C. TWEDDLE, have hereunto set my hand in presence of witnesses.

HERBERT W. C. TWEDDLE.

Witnesses:
A. S. NICHOLSON,
J. M. NEAL.